UNITED STATES PATENT OFFICE.

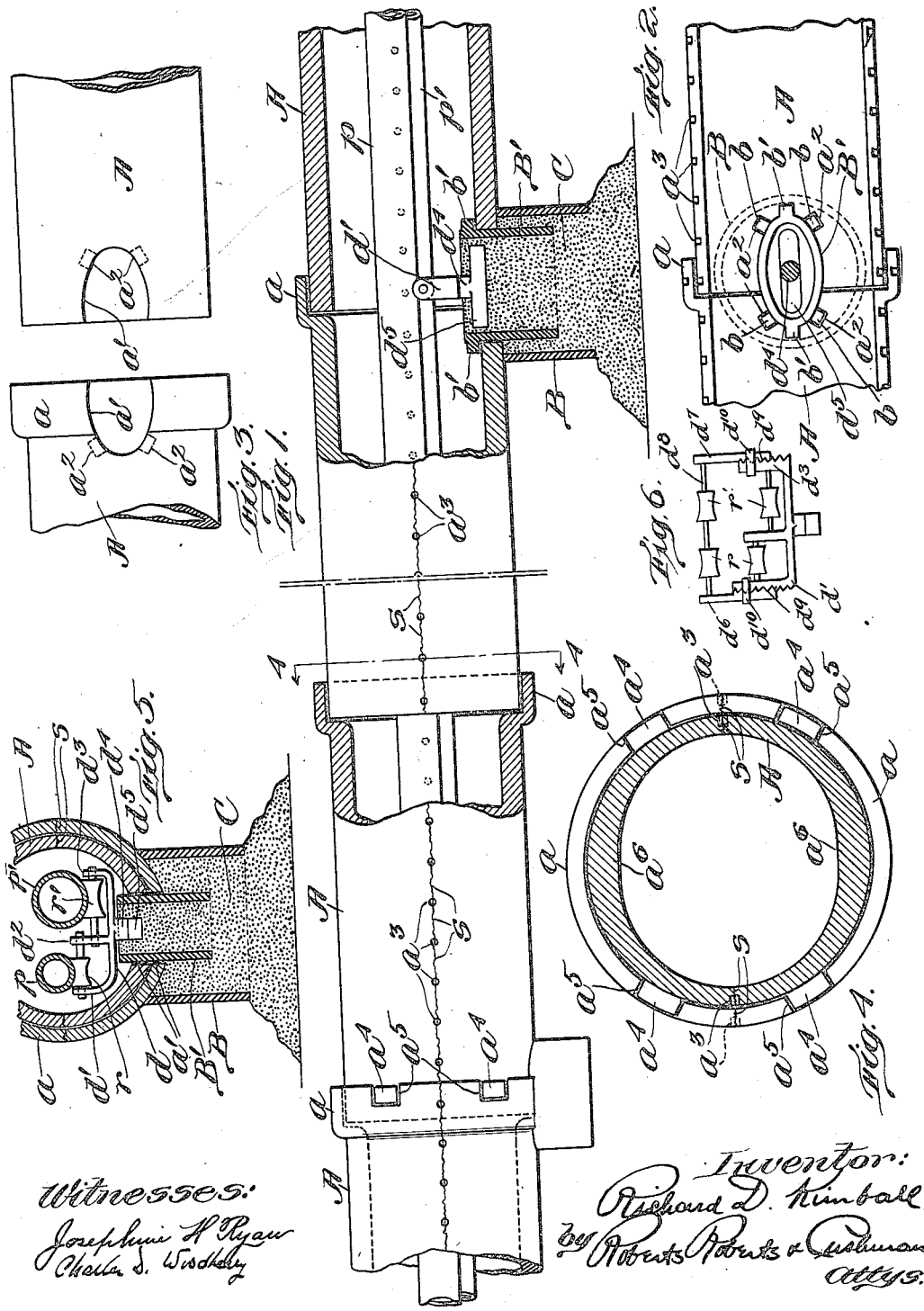

RICHARD D. KIMBALL, OF MEDFORD, MASSACHUSETTS.

SECTIONAL CONDUIT.

1,149,920.  Specification of Letters Patent.  Patented Aug. 10, 1915.

Application filed June 16, 1913. Serial No. 773,806.

*To all whom it may concern:*

Be it known that I, RICHARD D. KIMBALL, a citizen of the United States, and resident of Medford, in the county of Middlesex and State of Massachusetts, have invented new and useful Improvements in Sectional Conduits, of which the following is a specification.

This invention relates to sectional conduits for the insulation of pipes conveying gases or liquids, particularly such as are used for the distribution of a heating medium, in heating systems, from a central plant to remote points.

The invention has to do with a conduit of the same general character and for the same general purposes, as that shown in Letters Patent of the United States issued to me, Richard D. Kimball and Alexander A. McKenzie, December 12, 1899, No. 638,931, and consists in the improvements upon the device shown in said patent, hereinafter fully described and pointed out in the claims. Briefly stated, these improvements relate chiefly to the construction and manner of use of pedestals, standards or bases, which are independent of the conduit sections, as distinguished from the T-sections of said former patent; the method of splitting the conduit sections and of securing the split edges together again and reinforcing the line of split; the strengthening and reinforcing of the conduit sections both individually and interdependently when assembled with one another; the interlocking of the several parts; and the construction of the roll carrier for the pipes. These and other novel and improved features will hereinafter be more fully described and pointed out in the claims.

In the accompanying drawings, which illustrate one embodiment of the invention, Figure 1 is a side elevation, partly in vertical section, and partly broken away, of a sectional conduit containing the invention; Fig. 2 is a plan view of the adjacent ends of the lower half of two conduit sections showing one of the base members or pedestals in position; Fig. 3 is a bottom view of the adjacent ends of two conduit sections; Fig. 4 is an enlarged cross section through line 4—4 of Fig. 1; Fig. 5 is a cross sectional view through one of the bases or pedestals and the joint uniting two conduit sections, and Fig. 6 is a front view of an adjustable roll-carrier frame to support pipes within the conduit.

Referring to the drawings, A, A represent conduit sections, of earthenware, metal, or other suitable material, each having a bell end $a$ adapted to receive the "spigot end" or straight end of the next adjacent conduit section. At such intervals as may be necessary or desirable, say at intervals of three or four conduit sections, are pedestals or base members comprising the outer, upright walls B, made of tubular earthenware or other suitable material, and the inner upright walls B′ preferably elongated or of oval form in cross section with their longer diameter extending lengthwise of the conduit. Said pedestals are located at joints between the ends of certain of the conduit sections, and the inner tubes B′ of the pedestals project into the conduit, the ends of the conduit sections where the pedestals occur being provided with complementary recesses $a'$ in the lower sides of the sections forming with each other apertures shaped to fit the ends of the parts B′. Each recess $a'$ is also made with a pair of sockets $a^2$ to receive locking projections or lugs $b$ formed on the exterior of parts B′.

Each conduit section is made with a row of holes $a^3$ extending lengthwise at each side, by which the conduit section may be split lengthwise in halves, by the use of drift pins, wedges or the like. These rows of holes insure the breaking or splitting of the conduit section along a substantially regular serrated line $s$, thus overcoming the tendency heretofore existing of the sections to break unevenly and along a very irregular line.

At the strengthened or "spigot end" of each conduit section are locking projections or lugs $a^4$, two on the upper half and two on the lower half of the conduit section, each only a short distance removed from the line of split $s$ dividing the upper and lower halves; and each bell end $a$ is provided with corresponding sockets $a^5$ in which said lugs $a^4$ fit.

It will be understood that these conduits are buried underground, and that under the weight of the earth, particularly under heavy earth "fills" the downward pressure on the conduit sections, tends to spread or flatten them, with the result that the sections frequently break or crack along a line midway between the split edges *s*, especially along the top; and the lower edges of the upper half of the conduit sections, along the lines of cleavage *s*, tend to slip outward beyond the abutting edges of the under half,— a tendency accentuated by the downwardly slanting surface of the split shown in the conduit of said former patent. Furthermore, the closely fitting abutting surfaces of the serrated split edges shown in said former patent afford little opportunity for holding cement to counteract the tendency of the edges of the upper half to spread and slip past the edges of the lower half. With the present improved construction the split serrated edges insure a perfect fit as heretofore of the upper and lower halves of the conduit sections, while the holes $a^3$ are filled with cement, thus forming in effect a row of cement plugs or rivets, securely binding the abutting edges together, and affording a sufficient body of cement, in addition to the cement which is introduced between the serrated edges themselves, to insure a strong and rigid bond between the abutting edges, effectually preventing any tendency, even under extraordinary loads of earth filling, of the edges of the upper half to spread or slip past the edges of the lower half.

To reinforce the conduit along the top and bottom, which are especially vulnerable points under the stress of earth pressure, I have thickened the conduit sections along the top and bottom, as shown at $a^6$ (Fig. 4), thus overcoming the tendency of the conduit to break or crack along those lines. Thus the conduit sections are reinforced at their weak parts by thickening the walls at the points where they are most likely to break under pressure, and by binding the abutting edges together with cement plugs filling the holes $a^3$.

It will be noticed by reference to the drawings, especially Fig. 4, that the relatively thickened walls $a^6$ not only extend lengthwise midway between the abutting edges $a^3$, but also extend a substantial distance laterally and have curved surfaces merging gradually into the surface of the normal or relatively thin part of the conduit. Also, that said thickened walls as herein illustrated are formed on the inner side of the conduit leaving the outer surface circular in cross section. These lengthwise and laterally extending thickened walls $a^6$ reinforce each divided part of the conduit against splitting lengthwise and against permitting the abutting edges to spread under the stress of heavy earth pressure. The gradual merging of the curved surfaces of the thickened wall into the thinner wall of the conduit avoids the presence of any lengthwise extending groove or angle formed by two abruptly meeting surfaces. Such a groove or angle is an especially vulnerable feature as it tends to induce a break or split along that line. The gradual merging of the thickened part into the thin part of the conduit, wholly obviates such abrupt angle. Furthermore, by making the thickening on the inner side of the conduit, the capacity of the conduit is reduced in a vertical direction so that when pipes are in place side by side and the insulating material packed in around the pipes, the top and bottom walls of the conduit will be brought closer to the pipes, thereby effecting a saving of insulating material, while at the same time affording a depth of insulation above and below the pipes which is at least as great as at their sides, and is sufficient. It has also been found in practice that the bell end *a* is more fragile and much more likely to break than the "spigot end". In order to counteract this and give the bell end the greatest possible support and reinforcement from the "spigot end", and to interlock the adjacent ends of two sections together, to form a strong and practically continuous conduit, the interlocking lugs $a^4$ and sockets $a^5$ are provided, said interlocking elements, and the bell and "spigot ends", being all securely bound together with cement. It will be noted (Fig. 4) that these interlocking elements are located on the relatively thin parts of the conduit A between portions $a^6$, reinforced by the thickened walls, and the edges *s* of the split sections, reinforced by the cement plugs, whereby the "spigot end" and the bell end reinforce and strengthen each other at the only points not otherwise reinforced. The resulting structure is much stronger and more durable than has heretofore been devised.

In building or installing the conduit, the lower halves of the sections may be placed in position with their adjacent ends in engagement and interlocked, and resting on the outer walls B of the pedestal. The inner member B′ of the pedestal is then lowered into place from above through the apertures *a′*, until the ears *b′* rest on the conduit sections, thereby supporting the member B′ in position. The interior of the pedestal is then filled with cement or concrete C, which hardens and forms with the tubes B and B′ a practically solid monolithic pedestal, the central projection of which, formed by the tube B′ extends upward with the conduit, and the margin of which, surrounding the tube B′, forms a ledge supporting the conduit. It will be observed that said pedestals are formed independent of the conduit, as distinguished from the branches of the T-sections which constituted the conduit supports of the aforesaid former patent. Such T-sections owing to their shape, are exceedingly liable to breakage in transportation and handling, and also in case of the settling of the foundations under them, resulting in loss and expense, and also frequently in opening cracks in the completed conduit which destroys the essential water-tight character. By constructing the pedestals independent of the conduit proper as above described, not only is there great saving in breakage over the T-sections of said former patent, but as the pedestals instead of being component parts of the conduit, as are the T-sections, are independent of the conduit itself, the injurious effects of settling are avoided, since any slight settling of the pedestals would not break the conduit, but the pedestal could drop downwardly slightly without breaking the conduit, in which case the small and relatively fragile ears $b'$, used for temporarily holding the tube $B'$ in place during construction, would break off without otherwise damaging the structure. Furthermore, with my construction the whole weight of the pipes, and the roll-carriers or brackets for the pipes, is carried upon said independent pedestals, thereby relieving the conduits themselves of a very heavy strain.

The roll-carrier frames or brackets $d$ extend transversely of the conduit, and each comprises three arms or branches $d'$, $d^2$, and $d^3$. Between arms $d'$ and $d^2$ is journaled a roller $r$, and between arms $d^2$ and $d^3$ is journaled a roller $r'$. The smaller pipe $p$ rests on roller $r$, and the larger pipe $p'$ rests on roller $r'$, which is lower than roller $r$, thereby lowering the top of pipe $p'$ to substantially the same level as a pipe $p$, so that practically the same thickness of insulating material, such as a mass of asbestos fibers, which is packed within the conduit about the pipes, may cover the top of both pipes. The frame $d$ is connected by a post $d^4$ with a relatively long and narrow foot $d^5$, which extends at right angles to the frame $d$, and therefore lengthwise of the conduit. The foot $d^5$ is embedded in the concrete in the upper part of tube $B'$, and affords a solid support for the pipes $p$ and $p'$, adapted to resist any tendency of the roll frame $d$ to tilt, or work loose under the lengthwise movement of the pipes, as the latter expand and contract by reason of variations in temperature.

It will be understood that the edges of the apertures $a'$ and sockets $a^2$ in the conduit sections are cemented to the walls of pedestal member $B'$ and the locking projections $b$; and also that the bell end $a$ and the adjacent straight end of the successive conduit sections, and the interlocking lugs and sockets at $a^4$ and $a^5$, are similarly cemented together.

If desired, the shafts on which rollers $r$ and $r'$ are journaled, may be made vertically adjustable on the branches of the roll-carrier frame $d$, so as to admit of raising or lowering the pipes $p$ or $p'$, which may vary in size, to the proper or desired level within the conduit. A convenient device for effecting such vertical adjustment of some of the rollers is illustrated in Fig. 6, wherein the arms $d'$ and $d^3$ are provided with adjustable extension sections $d^6$ and $d^7$, between which extends a shaft $d^8$ carrying upper rollers $r$ and $r'$. Any suitable fastening means may be employed to hold the adjustable section to the arms of the roll-carrier frame in adjusted position. As herein shown the abutting faces of the extension sections and frame arms are correspondingly corrugated as shown at $d^9$, and the adjustable sections are held at the desired elevation by slipping the straps or bands $d^{10}$ to the positions shown after the corrugations have been placed in engagement. The upper rollers $r$ and $r'$ may thus be raised or lowered according to the size of the pipes carried thereby, or the size of the pipes carried by the lower rollers $r$ or $r'$.

I claim:

1. A conduit comprising a series of conduit sections, the adjacent ends of some of which are provided with complementary recesses forming with each other apertures in the bottom of the conduit, and pedestals formed independent of said conduit sections closely fitting said apertures and projecting into said conduit through said apertures.

2. A conduit comprising a series of conduit sections, the adjacent ends of some of which are provided with complementary recesses forming with each other apertures in the bottom of the conduit, pedestals formed independent of said conduit sections closely fitting said apertures and projecting into said conduit through said apertures, and one or more pipes within said conduit supported on said pedestals.

3. A conduit comprising a series of conduit sections, the adjacent ends of some of which are provided with complementary recesses forming with each other apertures in the bottom of the conduit, and pedestals formed independent of said conduit sections, each pedestal consisting of a monolithic structure of concrete composed of a conduit supporting ledge engaging the under side of said conduit and a column rising from said ledge and projecting into said conduit through said complementary recesses.

4. A sectional conduit having apertures in its under side, and pedestals formed independent of said conduit, each comprising an outer tubular wall surrounding one of said apertures and an inner tubular wall of earthenware projecting upward through such aperture, said tubular walls being filled with concrete, constituting a monolithic conduit-supporting base and pipe-supporting column.

5. A sectional conduit having apertures in its under side, pedestals formed independent of said conduit, each comprising an outer tubular wall surrounding one of said apertures and an inner tubular wall of earthenware projecting upward through such aperture, said tubular walls being filled with concrete, constituting a monolithic conduit-supporting base and pipe-supporting column, and one or more pipes within said conduit supported on the concrete within said inner tubular walls.

6. A sectional conduit having apertures in its under side, pedestals formed independent of said conduit, each comprising an outer tubular wall surrounding one of said apertures and an inner tubular wall of earthenware projecting upward through such aperture, said tubular walls being filled with concrete, constituting a monolithic conduit-supporting base and pipe-supporting column, pipe supporting frames anchored to the cement within said inner tubular walls, and one or more pipes within said conduit supported on said frames.

7. A sectional conduit having apertures in its under side, pedestals formed independent of said conduit each comprising a tubular wall filled with concrete, extending upwardly through one of said apertures into said conduit, and interlocking means between said pedestals and said conduit.

8. A sectional conduit having elongated apertures in its under side, and a pedestal formed independent of said conduit comprising a tubular wall of similarly elongated cross section, filled with concrete, extending upwardly through said aperture into said conduit.

9. A sectional conduit having elongated apertures in its under side, a pedestal formed independent of said conduit comprising a tubular wall of similarly elongated cross section, filled with concrete, extending upwardly through said aperture into said conduit, and a pipe supporting frame having a bearing foot anchored to said cement and disposed lengthwise of the longer diameter of said tubular wall.

10. A sectional conduit having elongated apertures in its under side, and a pedestal formed independent of said conduit comprising an outer tubular wall of circular cross section surrounding one of said apertures, and an inner tubular wall of elongated cross section extending upward through one of said elongated apertures into said conduit, said tubular walls being filled with concrete constituting a monolithic conduit-supporting base and pipe-supporting column.

11. A sectional conduit having elongated apertures in its under side, a pedestal formed independent of said conduit comprising an outer wall of circular cross section surrounding one of said apertures, an inner tubular wall of elongated cross section extending upward through one of said elongated apertures into said conduit, said tubular walls being filled with concrete, and a pipe supporting frame having an elongated foot inclosed in the concrete within the inner tubular wall, and extending lengthwise of its longer axis.

12. A conduit section having at each side a row of holes, by means of which the conduit may be split lengthwise along a substantially regular serrated line, and adapted to hold cement plugs for binding together the two split portions.

13. A conduit section divided in two lengthwise by rough or serrated edge surfaces, said edge surfaces having opposed recesses forming holes and said holes being filled with cement constituting plugs for binding together said two divided portions.

14. An earthenware conduit having an outer cylindrical surface, said conduit being divided in two lengthwise by abutting edge surfaces, the middle part of the wall of each divided section extending lengthwise between said abutting edge surfaces being thickened on the inner side of the conduit section and said thickened part being curved laterally and merging gradually into the surface of the relatively thin part of the conduit section, thereby reinforcing such divided section against splitting lengthwise under the stress of earth pressure and also forming in an exteriorly cylindrical conduit, a passage whose vertical diameter is less than its horizontal diameter.

15. In a conduit, a pedestal formed independent of the conduit and containing concrete, said pedestal projecting into the conduit, and a pipe-carrying frame in said conduit having an elongated supporting foot extending lengthwise of said conduit and embedded in said concrete.

Signed by me at Boston, Massachusetts this 10th day of June 1913.

RICHARD D. KIMBALL.

Witnesses:
ROBERT CUSHMAN,
CHARLES D. WOODBERRY.